(12) United States Patent
Muninder

(10) Patent No.: US 9,064,170 B2
(45) Date of Patent: Jun. 23, 2015

(54) METHOD, APPARATUS AND COMPUTER PROGRAM PRODUCT FOR ESTIMATING IMAGE PARAMETERS

(71) Applicant: Nokia Technologies Oy, Espoo (FI)

(72) Inventor: Veldandi Muninder, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 186 days.

(21) Appl. No.: 13/739,682

(22) Filed: Jan. 11, 2013

(65) Prior Publication Data

US 2013/0195377 A1 Aug. 1, 2013

(30) Foreign Application Priority Data

Jan. 11, 2012 (IN) .............................. 120/CHE/2012

(51) Int. Cl.
*G06K 9/32* (2006.01)
*G06K 9/62* (2006.01)

(52) U.S. Cl.
CPC ............ *G06K 9/3233* (2013.01); *G06K 9/6203* (2013.01); *G06K 9/6212* (2013.01)

(58) Field of Classification Search
CPC .... G06K 9/00; G06K 2209/403; G06T 7/001; G06T 7/0083; G06T 7/0085; G06T 7/0089; G06T 11/203; G06T 2207/20116; H01J 2237/2611; G03F 7/70516; G03F 7/70616; G03F 9/7011; G03F 9/7019; G03F 9/7076; G01B 15/04; H01L 21/02271
See application file for complete search history.

(56) References Cited

U.S. PATENT DOCUMENTS 7,463,791 B2 * 12/2008 Koehler et al. ................ 382/294
8,264,671 B2 * 9/2012 Aarts et al. ...................... 355/77

* cited by examiner

*Primary Examiner* — Jose Couso
(74) *Attorney, Agent, or Firm* — Alston & Bird LLP

(57) ABSTRACT

In accordance with an example embodiment a method, apparatus and computer program product are provided. The method comprises determining at least one first 1-D curve and at least one second 1-D curve. The method also comprises computing alignment parameters indicative of alignment adjustment between the at least one first 1-D curve and the at least one second 1-D curve. A scaling parameter and at least one translation parameter may be computed between the at least one first 1-D curve and the at least one second 1-D curve based at least on the alignment parameters.

17 Claims, 7 Drawing Sheets

METHOD, APPARATUS AND COMPUTER PROGRAM PRODUCT FOR ESTIMATING IMAGE PARAMETERS

TECHNICAL FIELD

Various implementations relate generally to method, apparatus, and computer program product for estimation of image parameters such as scaling parameter and translation parameters.

BACKGROUND

In recent years, various techniques have been developed for digitization and further processing of multimedia content. Examples of multimedia content may include, but are not limited to a video of a movie, a video shot, and the like. The digitization of the multimedia content facilitates in complex manipulation of the multimedia content for enhancing user experience with the digitized multimedia content. The multimedia content may be manipulated and processed based on various image parameters that may be utilized for image alignment. Image alignment includes a multitude of applications, including but not limited to, video stabilization, object tracking and the like.

SUMMARY OF SOME EMBODIMENTS

Various aspects of examples of examples embodiments are set out in the claims.

In a first aspect, there is provided a method comprising: determining at least one first one-dimensional (1-D) curve and at least one second 1-D curve; computing alignment parameters indicative of alignment adjustment between the at least one first 1-D curve and the at least one second 1-D curve; and computing a scaling parameter and at least one translation parameter between the at least one first 1-D curve and the at least one second 1-D curve based at least on the alignment parameters.

In a second aspect, there is provided an apparatus comprising at least one processor; and at least one memory comprising computer program code, the at least one memory and the computer program code configured to, with the at least one processor, cause the apparatus to perform at least: determining at least one first 1-D curve and at least one second 1-D curve; computing alignment parameters indicative of alignment adjustment between the at least one first 1-D curve and the at least one second 1-D curve; and computing a scaling parameter and at least one translation parameter between the at least one first 1-D curve and the at least one second 1-D curve based at least on the alignment parameters.

In a third aspect, there is provided a computer program product comprising at least one computer-readable storage medium, the computer-readable storage medium comprising a set of instructions, which, when executed by one or more processors, cause an apparatus to perform at least: determining at least one first 1-D curve and at least one second 1-D curve; computing alignment parameters indicative of alignment adjustment between the at least one first 1-D curve and the at least one second 1-D curve; and computing a scaling parameter and at least one translation parameter between the at least one first 1-D curve and the at least one second 1-D curve based at least on the alignment parameters.

In a fourth aspect, there is provided an apparatus comprising: means for determining at least one first 1-D curve and at least one second 1-D curve; means for computing alignment parameters indicative of alignment adjustment between the at least one first 1-D curve and the at least one second 1-D curve; and means for computing a scaling parameter and at least one translation parameter between the at least one first 1-D curve and the at least one second 1-D curve based at least on the alignment parameters.

In a fifth aspect, there is provided a computer program comprising program instructions which when executed by an apparatus, cause the apparatus to: determine at least one first 1-D curve and at least one second 1-D curve; compute alignment parameters indicative of alignment adjustment between the at least one first 1-D curve and the at least one second 1-D curve; and compute a scaling parameter and at least one translation parameter between the at least one first 1-D curve and the at least one second 1-D curve based at least on the alignment parameters.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 7B of the drawings.

Figure 1:
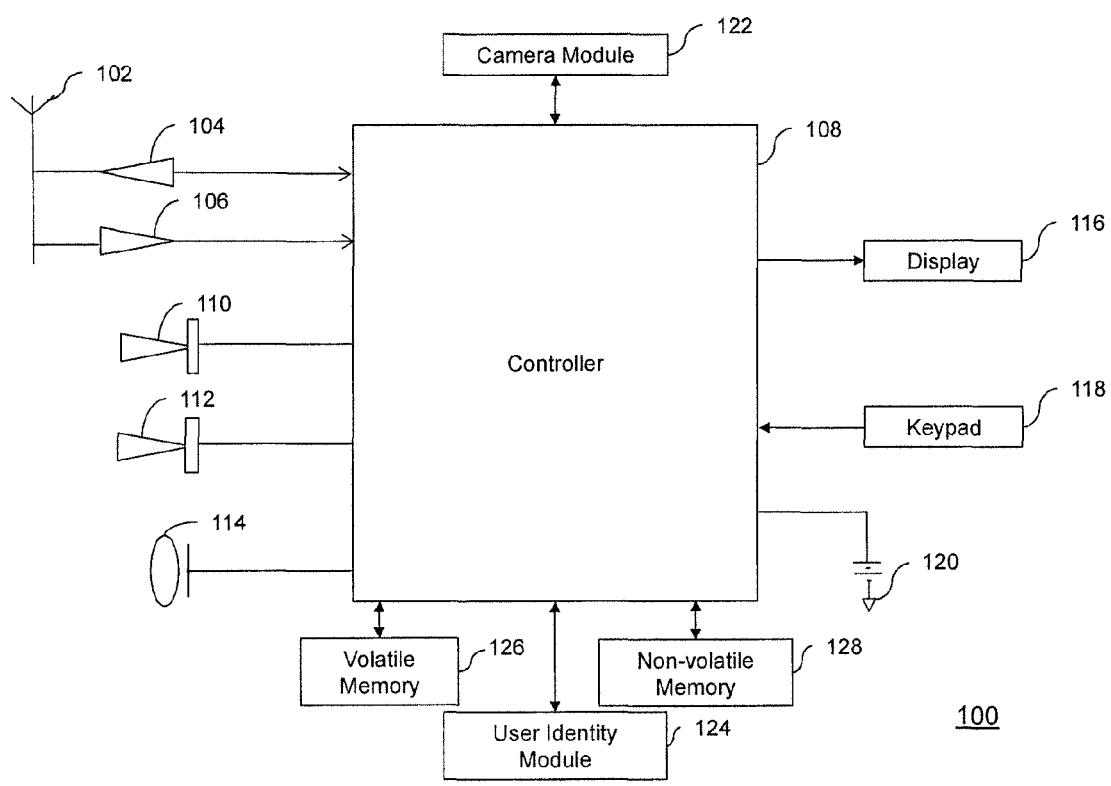
FIG. 1 illustrates a device in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/ MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
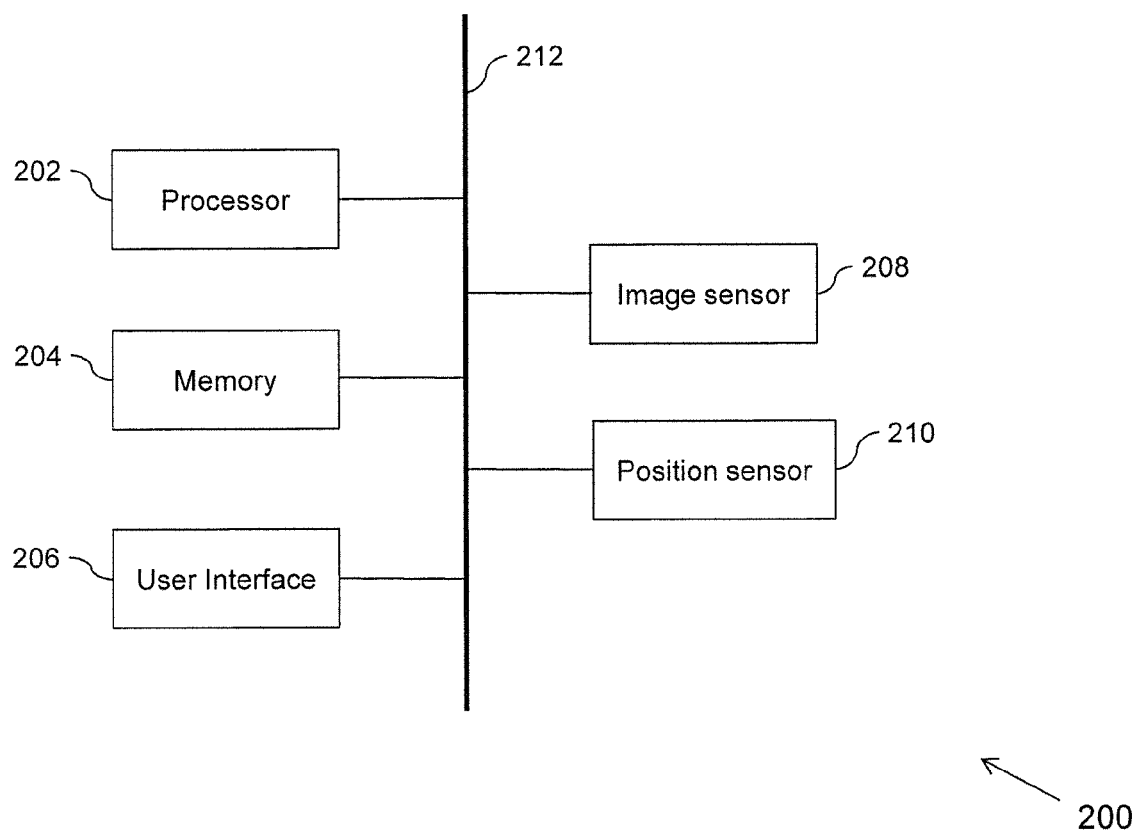
FIG. 2 illustrates an apparatus for estimating image parameters in accordance with an example embodiment.

FIG. 2 illustrates an apparatus 200 for estimating image parameters, in accordance with an example embodiment. The apparatus 200 may be employed for estimating image parameters, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the communication device may include a mobile phone, a personal digital assistant (PDA), and the like. Some examples of computing device may include a laptop, a personal computer, and the like. In an example embodiment, the communication device may include a user interface, for example, the UI 206, having user interface circuitry and user interface software configured to facilitate a user to control at least one function of the communication device through use of a display and further configured to respond to user inputs. In an example embodiment, the communication device may include a display circuitry configured to display at least a portion of the user interface of the communication device. The display and display circuitry may be configured to facilitate the user to control at least one function of the communication device.

In an example embodiment, the communication device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of media content may include audio content, video content, data, and a combination thereof.

In an example embodiment, the communication device may be embodied as to include an image sensor, such as an image sensor 208. The image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100.

In an example embodiment, the communication device may be embodied as to include an inertial/position sensor 210. The inertial/position sensor 210 may be in communication with the processor 202 and/or other components of the apparatus 200. The inertial/positional sensor 210 may be in communication with other imaging circuitries and/or software, and is configured to track movement/navigation of the apparatus 200 from one position to another position.

These components (202-210) may communicate to each other via a centralized circuit system 212 to perform estimation/computation of image parameters. The centralized circuit system 212 may be various devices configured to, among other things, provide or enable communication between the components (202-210) of the apparatus 200. In certain embodiments, the centralized circuit system 212 may be a central printed circuit board (PCB) such as a motherboard, main board, system board, or logic board. The centralized circuit system 312 may also, or alternatively, include other printed circuit assemblies (PCAs) or communication channel media.

In an example embodiment, the processor 202 is configured to, with the content of the memory 204, and optionally with other components described herein, to cause the apparatus 200 to compute image parameters associated with a multimedia content. In an embodiment, the multimedia content may be prerecorded and stored in the apparatus, for example the apparatus 200. In another embodiment, the multimedia content may be captured by utilizing the device, and stored in the memory of the device. In yet another embodiment, the device 100 may receive the multimedia content from internal memory such as hard drive, random access memory (RAM) of the apparatus 200, or from external storage medium such as DVD, Compact Disk (CD), flash drive, memory card, or from external storage locations through Internet, Bluetooth®, and the like. The apparatus 200 may also receive the multimedia content from the memory 204.

In an embodiment, the multimedia content may be associated with a scene. In an embodiment, the multimedia content may be captured by displacing the apparatus 200 in at least one direction. For example, the apparatus 200 such as a camera may be maintaining the camera in a stationary position, and recording motion of one or more moving objects. In another example embodiment, the camera may be moved around the scene either from left direction to right direction, or from right direction to left direction, or from top direction to a bottom direction, or from bottom direction to top direction, and so on. In an embodiment, the apparatus 200 may be an example of a media capturing device, for example, a camera. In some embodiments, the apparatus 200 may include a position sensor, for example the position sensor 210 for determining direction of movement of the apparatus 200 for capturing the multimedia content. In some embodiments, the multimedia content may include images of one or more objects captured at different times. In certain other embodiments, the multimedia content may include a video content, such as a short movie, recording of an event, and the like.

The multimedia content, such as video content captured by moving the image capturing device may be affected by the unsteadiness of a user's hands. Such a video content may show jerkiness and irregularity, which may be removed by processing the video content. The processing of the video content for removing the jerkiness during the recording of the video content may be referred to as 'video stabilization'. During video stabilization, motion of various frames (occurring due to the jerkiness/unsteadiness) is determined between the frames of the video, and an opposite motion may be applied to counteract image shake and realignment of the frames.

In an example embodiment, the processor 202 is configured to, with the content of the memory 204, and optionally with other components described herein, to cause the apparatus 200 to process the multimedia content, such as by performing image alignment. As described herein, the term 'image alignment' may refer to determining a similarity between two sequences or sets of data, and aligning these sets of data in a common co-ordinate system by transforming the data. For example, image alignment may be utilized for performing video stabilization to thereby enhance the video quality. In another example embodiment, image alignment may be utilized for transforming multiple photographs; data from diverse times, viewpoints, and the like. In yet another example embodiment, image alignment may be utilized for tracking a region, such as a face in a sequence of images.

In various embodiments, image alignment includes various processes such as rotation, scaling and translation. 'Image scaling' is a process of resizing the image. In image scaling, the size of the image may be increased or decreased, and accordingly image scaling may involve a negotiation between smoothness and sharpness of the image. For example, when the size of the image is increased, the pixels comprising the image may become fairly visible, thereby rendering the image blur. Conversely, when the image size is reduced, the sharpness of the image may increase. As referred herein, 'Image translation' or translation may refer to a process of moving an image in a vertical or a horizontal direction by a number of pixels to thereby displace the location of the image. In an embodiment, the image alignment may be performed by computation of various image parameters, such as image scaling parameter and image translation parameter associated with the processes of image scaling and image translation, respectively.

In an embodiment, the processor 202 is configured to, with the content of the memory 204, and optionally with other components described herein, to cause the apparatus 200 to compute the image parameters for facilitating image alignment. In an embodiment, the image parameters may be computed by aligning 1-D curves associated with the frames of the multimedia content, and determining a displacement between the 1-D curves. The displacement may then be negated for aligning the two 1-D curves and counteracting the effects of image misalignment.

In an example embodiment, the processor 202 is configured to, with the content of the memory 204, and optionally with other components described herein, to cause the apparatus 200 to determine at least one first 1-D curve and at least one second 1-D curve. In an embodiment, the at least one first 1-D curve and the at least one second 1-D curve may be associated with an object at different instances of time. In some embodiments, the at least one first 1-D curve and the at least one second 1-D curve may be associated with integral projections of at least one image in one or more directions. In an embodiment, the integral projections includes 1-D pattern, or signal or a curve. In an example embodiment, the 1-D curves may be integral projections obtained from an object but separated due to a time shift. In alternate embodiments, multiple integral projections associated with different directions may be obtained from an image. For example, horizontal and vertical integral projections associated with a horizontal direction and a vertical direction may be derived from an image. In an example embodiment, a processing means may be configured to determine the at least one first 1-D curve and the at least one second 1-D curve. An example of the processing means may include the processor 202, which may be an example of the controller 108.

In an embodiment, the at least one first 1-D curve may include a horizontal 1-D integral projection curve h1(x) and a vertical projection curve v1(x) associated with an image, while the at least one second 1-D curve may include a horizontal 1-D integral projection curve h2(x) and a vertical 1-D integral projection curve v2(x) associated with another image of an image sequence.

In an embodiment, the integral projections may include a 1-D curve or an array obtained through a sum of a set of pixels along a particular direction. For example, consider for two images I1 and I2 differing in scale and translation such that size of the both the images is same, for example W×H. The horizontal 1-D integral projection curve h1(x) and the vertical 1-D integral projection curve v1(x) associated with image I1 may be computed by summing the set of pixels associated with the image I1 in a horizontal direction and a vertical direction, respectively. Also, the horizontal 1-D integral projection curve h2(x) and the vertical 1-D integral projection curve v2(x) associated with image I2 are computed by summing the set of pixels associated with the image I2 in the horizontal direction and the vertical direction, respectively. For example, the equation for computation of the horizontal integral projection 1-D curves h1(x), h2(x) and the vertical integral projection 1-D curves v1(x), v2(x) for images I1 and I2 may be represented as:

$$h1(x) = 1/W \sum_{j=1}^{W} I1(x, j);$$

$$h2(x) = 1/W \sum_{j=1}^{W} I2(x, j)$$

$$v1(x) = 1/H \sum_{j=1}^{H} I1(j, x)$$

$$v2(x) = 1/H \sum_{j=1}^{H} I2(j, x)$$

where, W is the number of columns in the image and H is number of rows in the image.

In an embodiment, the horizontal integral projection 1-D curve h2(x) may be normalized by a scaling factor S based on the following expression:

$$S = \sum_{j=1}^{H} h1(j) / \sum_{j=1}^{H} h2(j)$$

$$h2'(x) = S * h2(x); \ 0 < x < H$$

In an embodiment, the normalized value of the horizontal integral projection 1-D curve h2(x) may be utilized for computation of the image parameters, such as the scaling parameter and the translation parameter.

In an embodiment, due to a difference between the alignment of the images, for example, the images I1 and I2, the respective horizontal projection curves (h1(x), h2(x)) and the vertical projection curves (v1(x), v2(x)) thereof may differ by a scaling parameter (for example, in) and a shift (indicated by at least one translation parameter c). In an embodiment, the images I1 and I2 may be aligned by computing the image parameters, and determining an alignment adjustment between the images based on the image parameters. In an embodiment, the images may be aligned so that the displacement between the image is minimum.

In an embodiment, the processor 202 is configured to, with the content of the memory 204, and optionally with other components described herein, to cause the apparatus 200 to compute alignment parameters indicative of alignment adjustment between the at least one first 1-D curve and the at least one second 1-D curve. In an embodiment, the alignment parameters are associated with corresponding matching locations between the at least one first 1-D curve and between the at least one second 1-D curve. For example, the alignment parameters may include a sequence of points that may be represented as 1-D curves in an appropriate co-ordinate system. In an embodiment, the 1-D curve associated with the alignment parameters may be aligned in a manner such that a maximum alignment or a point-wise matching is obtained between the two curves. In an example embodiment, a processing means may be configured to compute alignment parameters indicative of alignment adjustment between the at least one first 1-D curve and the at least one second 1-D curve. An example of the processing means may include the processor 202, which may be an example of the controller 108.

In an embodiment, the alignment parameters may be computed based on a curve warping technique. An example of the curve warping technique may include a dynamic time warping (DTW) technique. In an embodiment, the DTW technique may be utilized for determining an optimal alignment by performing warping between the 1-D curves such that the distance between the two curves is minimum. In an embodiment, the DTW technique may provide alignment parameters, for example index arrays corresponding to the 1-D curves such that the index arrays reveal the matching information between the 1-D curves. For example, for the horizontal projection 1-D curves h1(x) and h2(x) associated with images I1 and I2 respectively, the respective alignment parameters may include arrays h1$_{\_ind(x)}$ and h2$\_$ind(x) such that every point in the index array h1_ind(x) may correspond to one point in the index array h2_ind(x). The index arrays h1_ind(x) and h2_ind(x) corresponding to the 1-D curves h1(x) and h2(x), respectively are illustrated and explained in detail in FIG. 3B.

In an embodiment, the index arrays may be arranged in a straight line model. In an embodiment, the relationship between the index array h1_ind(x) and the index array h2_ind(x) may be represented as:

$$h1\_ind(x) = m * h2\_ind(x) + c,$$

wherein, m is the scaling parameter, and c is the at least one translation parameter between the index arrays h1_ind(x) and h2_ind(x).

In some embodiment, the first 1-D curve and the second 1-D curve may be associated with the images. In these embodiments, the index arrays may be arranged based on straight line model as:

$$h1\_ind(x)=m\_x*h2\_ind(x)+dx; \text{ and}$$

$$v1\_ind(x)=m\_y*v2\_ind(x)+dy;$$

wherein, h1_ind(x) and h2_ind(x) are the alignment parameters associated with the at least one horizontal 1-D integral projection curves, v1_ind(x) and v2_ind(x) are the alignment parameters associated with the at least one vertical 1-D integral projection curve, m is the scaling parameter, dx is the at least one translation parameter in x-direction, and dy is the at least one translation parameter in y-direction.

In various embodiments, the processor 202 is configured to, with the content of the memory 204, and optionally with other components described herein, to cause the apparatus 200 to store the alignment parameters associated with the at least one first 1-D curve and the at least one second 1-D curve. In an example embodiment, a memory means may be configured to store the alignment parameters associated with the at least one first 1-D curve and the at least one second 1-D curve. An example of the memory means may include the memory 204, which may be an example of the controller 108.

In an embodiment, the processor 202 is configured to, with the content of the memory 204, and optionally with other components described herein, to cause the apparatus 200 to compute a scaling parameter and at least one translation parameter between the at least one first 1-D curve and the at least one second 1-D curve based at least on the alignment parameters. In an embodiment, computing the scaling parameter and the at least one translation parameter includes estimating a straight line associated with a minimum distance path between the at least one first 1-D curve and at least one second 1-D curve such that the minimum distance is less than a predetermined threshold distance. For example, for the two curves h1(x) and h2(x), computing the image parameters may include minimizing the function:

$$dist(m_t,c_t)=sqrt((h1\_ind(x)-(h2\_ind(x)*m_t+c\_t))^2$$

In an example embodiment, a processing means may be configured to compute the scaling parameter and the at least one translation parameter between the at least one first 1-D curve and the at least one second 1-D curve based at least on the alignment parameters. An example of the processing means may include the processor 204, which may be an example of the controller 108.

In an embodiment, wherein the at least one first projection 1-D curve and the at least one second projection 1-D curve are associated with images, computing the scaling parameter and the at least one translation parameter includes computing the scaling parameter and the at least one translation parameter in the x-direction based on the alignment parameters associated with the at least one horizontal 1-D integral projection curves; and computing the at least one translation parameter in the y-direction based on the alignment parameters associated with the at least one vertical 1-D integral projection curves and the scaling parameter. In an embodiment, computing the at least one translation parameter based on the computed alignment parameter facilitates in increasing the accuracy of computation.

In an embodiment, a technique known as random sample consensus (RANSAC) may be utilized for computing the values of the scaling parameter and the at least one translation parameter between the matched locations on the 1-D curves that may satisfy the minimum distance function, $dist(m_t,c_t)$. For example, any two random co-located points may be considered on the curves (or the index arrays) h1_ind(x) and h2_ind(x), and the scaling parameter and the translation parameter may be determined therefrom. The remaining co-located points on the curves (or the index arrays) h1_ind(x) and h2_ind(x) that may approximately satisfy the scaling parameter and the at least one translation parameter may be considered as inliners. In an embodiment, a point in the array is an inline when the value of distance $dist(m_t,c_t)$ as given by the minimum distance function for the point is below predetermined threshold distance. In an embodiment, the predetermined threshold distance is about 1.5. However, the value of the predetermined threshold distance may vary based on various applications of image alignment.

In an embodiment, the process of considering random co-located points on the curves h1_ind(x) and h2_ind(x) for computing the values of the scaling parameter and the at least one translation parameter, and then determining the number of remaining points that may satisfy these values of the scaling parameter and the at least one translation parameter, may be repeated until a final value of the scaling parameter and the at least one translation parameter are determined that gives a maximum number of inliners for a predetermined number of iterations.

In an exemplary embodiment, the scaling parameter and the translation parameters computed herein may be utilized for tracking objects, for example a face portion in a multimedia content. In some embodiments, a processing means may be configured for tracking the face portion in the multimedia content by utilizing the scaling parameter and the at least one translation parameter. An example of the processing means may include the processor 202, which may be an example of the controller 108. The tracking of an object, for example a face portion by utilizing the computed image parameters is explained in detail with reference to FIGS. 6A and 6B.

In another embodiment, the image parameters may be utilized for video stabilization application. In some embodiments, a processing means may be configured to aligning the plurality of successive frames based on the computed scaling parameter and the at least one translation parameter. An example of the processing means may include the processor 202, which may be an example of the controller 108. In an embodiment, the computed scaling parameter and the at least one translation parameter facilitates in stabilization of a multimedia content. Various embodiments of image alignment are further described in FIGS. 3 to 7B.

Figure 3A:
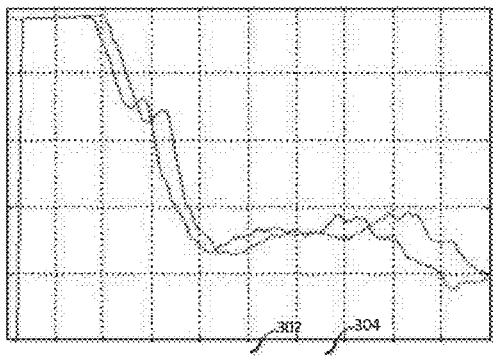
FIGS. 3A, 3B and 3C illustrate plots of 1-D curves for estimating image parameters in accordance with an example embodiment.
Figure 3B:
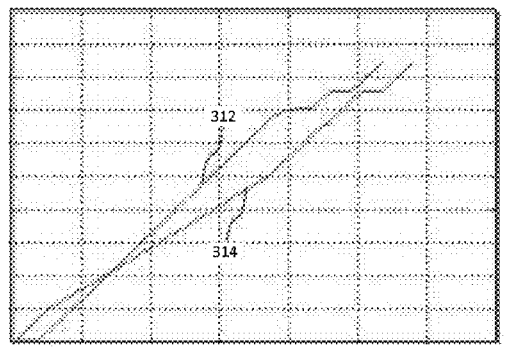
Figure 3C:
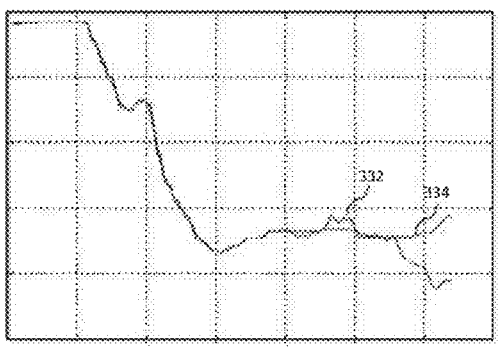

FIGS. 3A, 3B and 3C illustrates plots of 1-D curves for estimating image parameters in accordance with an exemplary embodiment. For example, FIG. 3A illustrates plots of the at least one first 1-D curve 302 and at least one second 1-D curve 304 in accordance with an example embodiment. FIG. 3B illustrates a plot of the alignment parameters (or index arrays) 312, 314 associated with the first 1-D curve 302 and the second 1-D curve 304 respectively. FIG. 3C illustrates a plot showing alignment of 1-D curves being aligned after the index arrays 312, 314 are modified by the DTW technique.

As illustrated in FIG. 3A, the at least one first 1-D curve may be a reference curve h1(x) (represented as 302), and the at least one second 1-D curve may be a warped 1-D curve h2(x) (represented as 304) generated upon applying a known scaling parameter (m_ref) and a known translation parameter (c_ref) to the at least one first 1-D curve (h1(x)) 302. In an embodiment, the curve 302 and the curve 304 may be utilized for computing the most optimal scaling parameter and the at least one translation parameter. In an embodiment, a DTW alignment is computed between the 1-D curves 302 and 304. As discussed with reference to FIG. 2, the DTW technique facilitates in warping the 1-D curve to generate index arrays, for example, index arrays h1_ind(x) and h2_ind(x), such that the 1-D curves align in most optimal manner. Referring to FIG. 3B, the index arrays h1_ind(x) 312 and h2_ind(x) 314 are illustrated in accordance with an example embodiment. In the present embodiment, the index arrays h1_ind(x) 312 and h2_ind(x) 314 may be the horizontal integral projection curves obtained from the 1-D curves h1(x) and h2(x). In alternate embodiments, the index arrays corresponding to the vertical projections may also be obtained from 1-D curves, for example from vertical projection 1-D curves. In an embodiment, based on the curve warping technique the 1-D curves h1(x) and h2(x) may be modified to most optimally aligned curves. For example, Referring to FIG. 3C, the modified 1-D curves h1(h1_ind(x)) (represented as 332) and h2(h2_ind(x)) (represented as 334) are obtained by applying curve warping technique to the 1-D curves h1(x) and h2(x), respectively.

Figure 4:
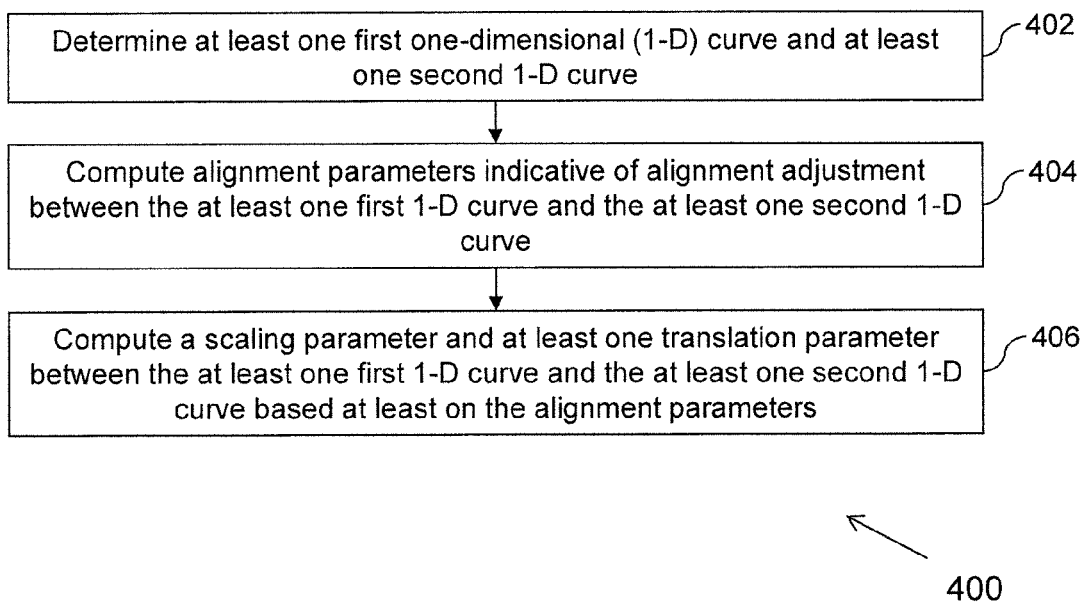
FIG. 4 is a flowchart depicting an example method for estimating image parameters in accordance with an example embodiment.

FIG. 4 is a flowchart depicting an example method 400 for estimating image parameters, in accordance with an example embodiment. The method depicted in the flow chart may be executed by, for example, the apparatus 200 of FIG. 2. In an embodiment, image parameters may be estimated for performing image alignment. In an embodiment, the image parameters may include scaling parameters and at least one translation parameters. The method 400 depicts a method for computation of the scaling parameters and at least one translation parameters in robust and efficient manner.

At block 402, at least one first 1-D curve and at least one second 1-D curve may be determined. In an embodiment, the at least one first 1-D curve may be associated with an object at different instances of time. As illustrated in FIG. 3A, the first 1-D curve may be represented as h1(x), and the second 1-D curve may be represented h2(x). In certain embodiments, the at least one first 1-D curve may include a reference curve and the at least one second 1-D curve may include a test curve. In certain other embodiments, the at least one first 1-D curve and the at least one second 1-D curves may include horizontal and vertical integral projection curves associated with at least one image. For example, the at least one first 1-D curve may include horizontal projections h1(x) and vertical projections v1(x) associated with an image, and the at least one second 1-D curve may include horizontal projection h2(x) and vertical projection v2(x) associated, with another image such that the two images may be shifted slightly in size and position.

At block 404, alignment parameters indicative of alignment adjustment between the at least one first 1-D curve and the at least one second 1-D curve are computed. In an embodiment, the alignment parameters h1_ind(x) and h2_ind(x) may include a sequence of points that may be represented collectively as 1-D curves in an appropriate co-ordinate system. In an embodiment, the alignment parameters are associated with corresponding matching locations between the at least one first 1-D curve and the at least one second 1-D curve.

In an embodiment, the alignment parameters are arranged in a straight line model based on the following equation as:

$$h1\_ind(x)=m*h2\_ind(x)+c,$$

wherein h1_ind(x) and h2_int(x) are the index arrays (alignment parameters) associated with the at least one first 1-D curve and the at least one second 1-D curve, m is the scaling parameter, and c is the at least one traditional parameter.

In some embodiments, the alignment parameters are associated with the integral projection curves such as horizontal integral projection curves and vertical integral projection curves. In various embodiments, the alignment parameters may be computed based on a DTW technique. The DTW technique may provide alignment parameters, for example index arrays corresponding to the 1-D curves such that the index arrays reveal the matching information of the 1-D curves. For the 1-D curves such as h1(x) and h2(x), the two index arrays may be represented as index arrays h1_ind(x) and h2_ind(x). In an embodiment, the curves or the index arrays h1_ind(x) and h2_ind(x) may be aligned in a manner such that a maximum alignment or a point-wise matching is obtained between the two curves.

At 406, a scaling parameter and at least one translation parameter are computed between the at least one first 1-D curve and the at least one second 1-D curve computed based at least on the alignment parameters. In an embodiment, wherein the at least one first 1-D curve and the at least one second 1-D curve are associated with images, the scaling parameter and the at least one translation parameter may be computed based on the expressions:

$$h1\_ind(x)=m\_y*h2\_ind(x)+dx;\text{ and}$$

$$v1\_ind(x)=m\_x*v2\_ind(x)+dy;$$

wherein, h1_ind(x) and h2_ind(x) are the alignment parameters associated with the at least one horizontal 1-D integral projection curves, v1_ind(x) and v2_ind(x) are the alignment parameters associated with the at least one vertical 1-D integral projection curves, and dx and dy are image translation parameters that may be obtained from the horizontal integral projections and the vertical integral projections, respectively. In an embodiment, the final scaling parameter of the slope may be computed based on the following equation:

$$m\_xy=(m\_x+m\_y)/2$$

In an embodiment, for example, in case of images, the value of m_xy may be determined only from a set of integral projection and re-used for determination of a translation parameter in other set of integral projections. For example, using the below equation, m_xy and dx may be computed:

$$h1\_ind(x)=m\_xy*h2\_ind(x)+dx$$

Now, utilizing the computed values of m_xy and dx, the value of dy may be computed as follows:

$$v1\_ind(x)=m\_xy*v2\_ind(x)+dy$$

The computation of the slope from one set of projections (h1(x), h2(x)), and re-using the computed projection and the other set of projections (v1(x), v2(x)) to determine the translation parameter equation, is based on the observation that for images, the slope m_xy is same along horizontal and vertical directions. So, the slope or scaling parameter (m_xy) computed from the horizontal projections is reused in vertical projections, and only dy is computed from the vertical projections. This dependency of the slope (m_xy) between the horizontal and vertical projections improves robustness in accurately computing the parameters.

In an embodiment, the scaling parameter and the translation parameters computed based on the alignment parameters are robust and may be utilized for a variety of applications, for example, for object tracking, video stabilization and the like.

Figure 5:
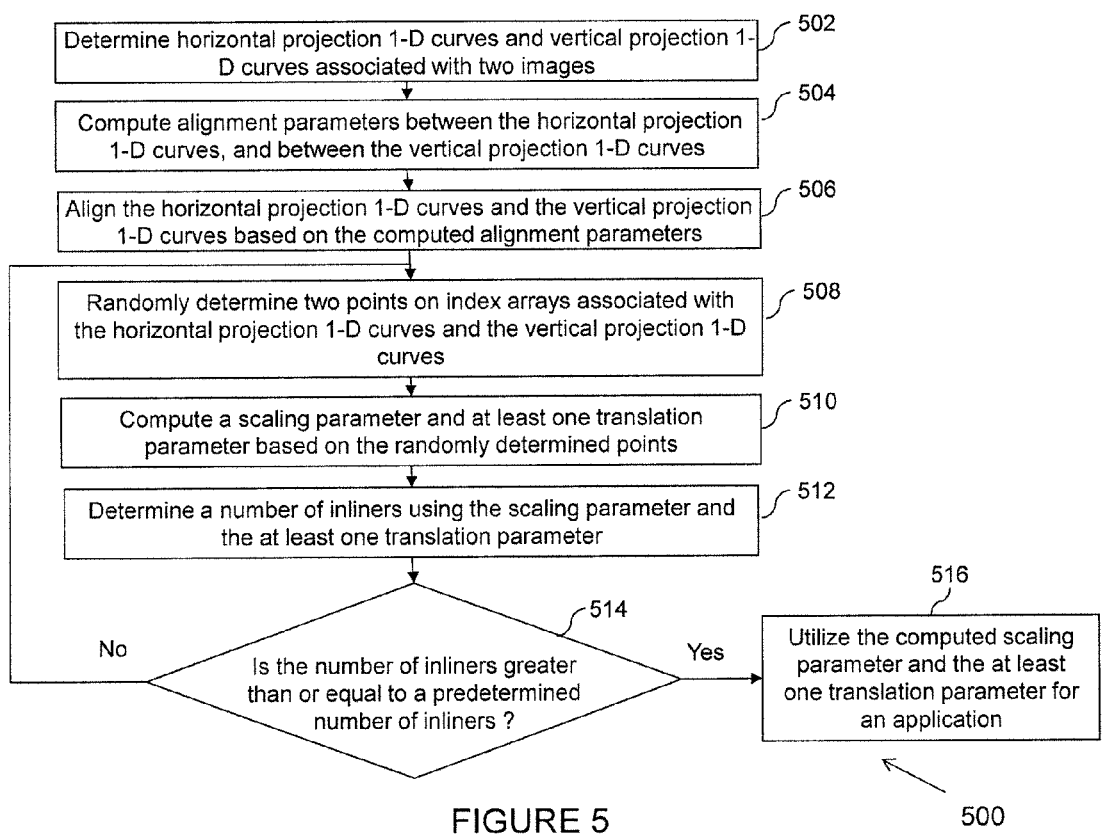
FIG. 5 is a flowchart depicting an example method for estimating image parameters in accordance with another example embodiment.

FIG. 5 is a flowchart depicting an example method 500 for estimation of image parameters, in accordance with another example embodiment. The method 500 depicted in flow chart may be executed by, for example, the apparatus 200 of FIG. 2. Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the method 500 are described with help of apparatus 200. However, the operations of the method can be described and/or practiced by using any other apparatus.

At block 502, horizontal projection 1-D curves and vertical projection 1-D curves associated with two images are determined. In an embodiment, the two images may be of the same object and may differ in scale and translation (indicated by a scaling parameter m, and translation parameters in x and y directions (dx and dy), respectively). In an embodiment, the horizontal projection 1-D curves and the vertical projection 1-D curves may be determined based on the integral projection method. In the integral projection method, the horizontal projection and the vertical projection of an image may be determined by computing a sum of image pixels along a horizontal direction and a vertical direction, respectively. The horizontal projection 1-D curves and the vertical projection 1-D curves may be represented as $h1(x)$, $h2(x)$ and $v1(x)$, $v2(x)$, respectively.

In an embodiment, the horizontal projection 1-D curves and the vertical projection 1-D curves may be represented by means of respective arrays, such that each point in the array of one horizontal projection 1-D curve $h1(x)$ associated with one image may have a corresponding point in the array of another horizontal projection 1-D curve $h2(x)$ associated with another image. In a similar manner, each point in the array of one vertical projection 1-D curve $v1(x)$ associated with one image may have a corresponding point in the array of another vertical projection 1-D curve $v2(x)$ associated with another image.

At block 504, alignment parameters may be computed between the horizontal projection 1-D curves $h1(x)$, $h2(x)$ and between the vertical projection 1-D curves $v1(x)$, $v2(x)$.

In an embodiment, the alignment parameters are indicative of the alignment adjustment between the horizontal projection 1-D curves $h1(x)$, $h2(x)$ and between the vertical projection 1-D curves $v1(x)$, $v2(x)$. In an embodiment, the alignment parameters may be computed based on a curve warping technique known as DTW. In an embodiment, the DTW technique determines a similarity between two the images that may be differing in scaling and translation. Using the DTW technique, the similarity between the two images may be determined by aligning the two images (or integral projection curves associated with the two images) and computing a minimum distance between them.

In an embodiment, the DTW technique facilitates in alignment of the 1-D projection curves with a given template curve so that a total distance measured between the 1-D projection curve and the reference/template curve is minimized. In an embodiment, the reference curve (for example, the horizontal projection curve $h1(x)$) may be of length M and the test horizontal projection curve (for example, the horizontal projection curve $h2(x)$ may be of length N. In order to align the reference/template curve $h1(x)$ of length M and the test curve $h2(x)$ of length N, a local cost matrix may be defined for representing pair wise distances between the corresponding components of the horizontal projection curves $h1(x)$ and $h2(x)$. In an embodiment, since the two images may be associated with proximate frames of a multimedia content, the cost function (or the distance) may have a small value.

In an embodiment, the cost function (or the distance) may be determined based on the following expression:

$$\text{dist}(m_t, c_t) = \text{sqrt}((h1\_\text{ind}(x) - (h2\_\text{ind}(x) * m_t + c\_\_t))^2$$

wherein, $h1\_\text{ind}(x)$ and $h2\_\text{ind}(x)$ are the warped horizontal projection curves (or index matrices).

In an embodiment, the index matrices $h1\_\text{ind}(x)$ and $h2\_\text{ind}(x)$ may be of size 1×T, wherein T is a count obtained based on DTW. In an embodiment, the value of T may depend on the scaling parameter. In an embodiment, the values of scaling parameter and the at least one translation factor may be computed in a manner that the value of the distance determined by the cost function, $\text{dist}(m_t, c_t)$ based on the computed values of the scaling parameter and the translation parameter may be minimized.

At block 508, two points are randomly determined on the index arrays $h1\_\text{ind}(x)$ and $h2\_\text{ind}(x)$ associated with the horizontal projection 1-D curves $h1(x)$, $h2(x)$. Similarly, two points may be randomly determined on the index arrays $v1\_\text{ind}(x)$ and $v2\_\text{ind}(x)$ associated with the vertical projection 1-D curves $v1(x)$, $v2(x)$, respectively. At block 510, a scaling parameter and at least one translation parameter may be computed based on the randomly generated points on the index arrays $h1\_\text{ind}(x)$, $h2\_\text{ind}(x)$, $v1\_\text{ind}(x)$, $v2\_\text{ind}(x)$. In an embodiment, a straight line model may be fitted between the index arrays for determination of the scaling parameter and the at least one translation parameter. In an embodiment, the straight line mode may be fitted by utilizing a RANSAC method. In an embodiment, the straight line model may be represented by the following equations:

$$h1\_\text{ind}(x) = m\_y * h2\_\text{ind}(x) + dx; \text{ and}$$

$$v1\_\text{ind}(x) = m\_x * v2\_\text{ind}(x) + dy;$$

wherein, $m\_xy = (m\_y + m\_x)/2$ is the scaling parameter, $dx$ is the at least one translation parameter in x-direction, and $dy$ is the at least one translation parameter in y-direction. The values of the scaling parameter $m\_xy$, and at least one translation parameters $dx$ and $dy$ may be determined from the above two equations.

In an alternate embodiment, for example, in case of images, the scaling parameter may not vary and may remain same along horizontal direction and vertical direction. In the present embodiment, the RANSAC method may be applied for determination of the scaling parameter m and the translation parameter dy using the equation:

$$h1\_ind(x)=m*h2\_ind(x)+dx$$

The values of the scaling parameter in and the translation factor dx may be reused for computation of the translation parameter dy based on the RANSAC method by utilizing the following equation:

$$v1\_ind(x)=m*v2\_ind(x)+dy$$

At block 512, a number of inliners may be determined between the points, for example 'T' points using the computed scaling parameter and the at least one translation parameter. The inliners may refer to those points that may lie within a predetermined threshold distance from the straight line, while the points that lie far away from the predetermined threshold distance may be referred to as outliners. In an embodiment, the predetermined threshold distance is about 1.5. However, the value of the predetermined threshold distance may vary based on various applications of image alignment.

At block 514, it may be determined whether the number of inliners is greater than or equal to a predetermined number of inliners. In an embodiment, the predetermined number of inliners may different for different applications and may be dependent on the amount of accuracy and robustness required for the application. For example, the predetermined number of inliners may be a maximum number of inliners that may be determined from the computed scaling parameter and the at least one translation parameter. If at block 514, it is determined that the number of inliners is not greater or equal to than the predetermined number of inliners, then two points may again be randomly determined on the index arrays associated with the horizontal projection 1-D curves and the vertical projection 1-D curves at block 508, and the method is repeated from blocks 508-512 till it is determined at block 514 that the number of inliners is greater or equal to than the predetermined number of inliners.

If it is determined at block 514 that the number of inliners is greater or equal than the predetermined number of inliners, then at block 516 the computed scaling parameter and the at least one translation parameter may be utilized for an application. In an example embodiment, the scaling factor and the at least one translation parameter may be utilized for stabilization and/or alignment of frames in a video content. For example, during the capture of a multimedia content such as the video content by moving an image capturing device (such as a camera), the captured video content may show jerkiness because of an unsteadiness of a user's hands holding the camera. Such jerkiness may be removed from the video content by a process known as video stabilization.

During video stabilization, motion of various frames (occurring due to the jerkiness/unsteadiness) is determined between the frames of the video, and an opposite motion may be applied to counteract image shake and realign the frames. In an embodiment, the video stabilization may be performed by performing smoothing on image parameter, for example, the scaling parameter and the translation parameter, and thereafter stabilizing the video content. In an embodiment, for a video content comprising N frames, the smoothing of the image parameters may be performed by using a moving average filter.

In an embodiment, dx(i), dy(i) are the translation in x, y directions respectively, and m(i) is the slope of every frame, then the moving average values of the translations in the x and y direction and the slope of the frames may be determined based on the following equations:

$$mv\_x = 1/L \sum_{i=1}^{L} dx(i');$$

$$mv\_y = 1/L \sum_{i=1}^{L} dy(i'); \text{ and}$$

$$mv\_m = 1/L \sum_{i=1}^{L} m(i');$$

Where i'=mod(i,L); and
mv_x, mv_y and mv_m are the moving average values.

In an example embodiment, video stabilization is achieved by applying the following correction to every frame:

$$\Delta x = mv\_x - dx(i);$$

$$\Delta y = mv\_y - dy(i);$$

$$\Delta m = mv\_m - dm(i);$$

where, $\Delta x$, $\Delta y$ are the corrections in the translation parameters in x and y directions respectively, and $\Delta m$ is the correction in the scaling parameter.

In another example embodiment, the computed values of the scaling parameter and the at least one translation parameter may be utilized for tracking an object in an image sequence. For example, the computed values of the scaling parameter and the at least one translation parameter may be utilized for face tracking. A method of tracking a face portion based on the scaling parameter and the translation parameter is explained in detail with reference to FIGS. 6A and 6B.

In an example embodiment, a processing means may be configured to perform some or all of: determining at least one first one-dimensional (1-D) curve and at least one second 1-D curve; computing alignment parameters indicative of alignment adjustment between the at least one first 1-D curve and the at least one second 1-D curve; and computing a scaling parameter and at least one translation parameter between the at least one first 1-D curve and the at least one second 1-D curve based at least on the alignment parameters. An example of the processing means may include the processor 202, which may be an example of the controller 108.

To facilitate discussion of the method 500 of FIG. 5, certain operations are described herein as constituting distinct steps performed in a certain order. Such implementations are exemplary and non-limiting. Certain operation may be grouped together and performed in a single operation, and certain operations can be performed in an order that differs from the order employed in the examples set forth herein. Moreover, certain operations of the method 500 are performed in an automated fashion. These operations involve substantially no interaction with the user. Other operations of the method 500 may be performed by in a manual fashion or semi-automatic fashion. These operations involve interaction with the user via one or more user interface presentations.

Figure 6A:
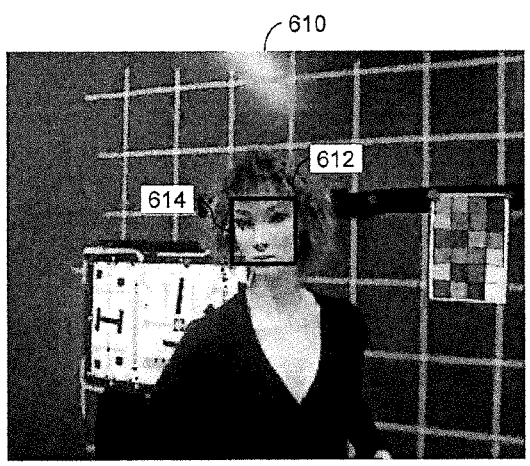
FIGS. 6A and 6B illustrate snapshots of images for tracking of a face portion by utilizing image parameters in accordance with an exemplary embodiment.

FIG. 6 illustrates snapshots 610 and 620 of an image for tracking of a face portion by utilizing image parameters in accordance with an exemplary embodiment. The method described in flowchart 500 of FIG. 5 may be utilized for performing accurate face tracking. For performing an accurate face tracking, a face detection may be performed on various video frames associated with the video content. In an embodiment, the face detection may be performed by utilizing a generic face detector or a face detection algorithm. In response to the face detection, a face portion may be detected in one of the frames. The face portion may be referred to a 'reference face portion' (represented as 612). In an embodiment, the 'reference face portion' 612 may be enclosed in a 'reference face box' such as a 'reference face box 614' illustrated in FIG. 6A.

Utilizing the 'reference face portion', a test face portion 622 associated with the detected face may be detected. As illustrated in FIG. 8B, the 'test face portion' 622 may be enclosed in a 'test face box' such as a 'test face box 624' illustrated in FIG. 6B. In an embodiment, the test face box 624 may be differing from the reference face box 614 in scale and position. In an embodiment, the difference in the scale and position of the reference face box 614 and the test face box 624 may be determined by computing the scaling parameter and the at least one translation parameters between the 1-D projection curves associated with reference face box 614 and the test face box 624.

Figure 6B:
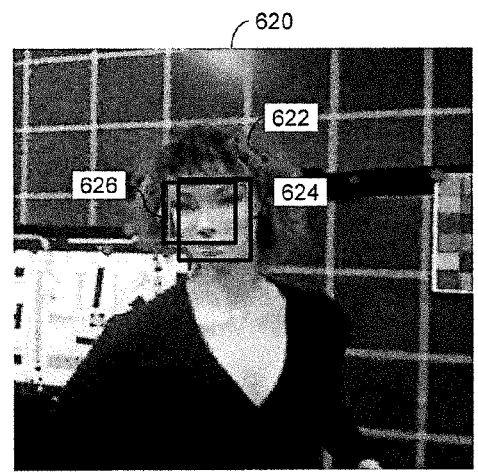

As discussed with reference to FIGS. 4 and 5, initially a horizontal projection 1-D curve h1(x) and a vertical projection 1-D curve v2(x) may be computed for the reference face portion 612. A co-located region 626 of the same size may be considered in the next frame (for example, in the snapshot 620). As illustrated in FIG. 6B, the collocated region 626 is of the same size as the size of the reference face portion 612 even though the size of the test face region 622 is different from the size of the reference face region 612. In an embodiment, a horizontal projection 1-D curve h2(x) and a vertical projection 1-D curve v2(x) may be computed by utilizing the collocated region 626. Using the determined projections curves h2(x) and v2(x), the size (given by m) and the position (given by dx and dy) of the test face box 624 may be computed.

Figure 7A:
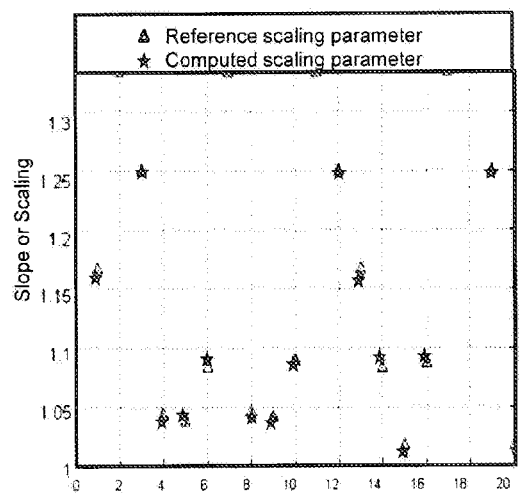
FIGS. 7A and 7B illustrate plots of reference image parameters versus estimated image parameters in accordance with an example embodiment.
Figure 7B:
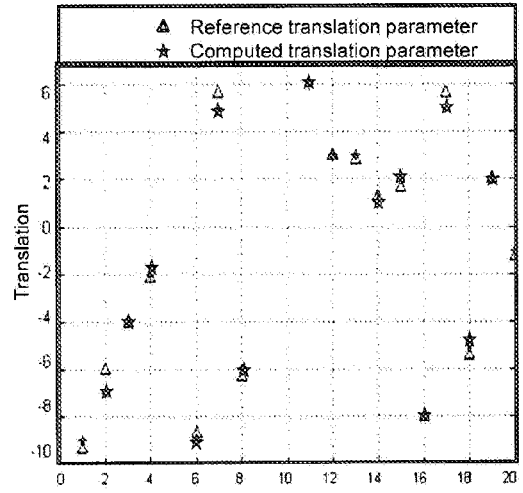

FIGS. 7A and 7B illustrate plots of reference image parameters versus estimated image parameters in accordance with an example embodiment. The image parameters may include a scaling parameter and a translation parameter. As illustrated in FIGS. 7A and 7B, the values of the reference scaling parameter is varied between 0.64 and 1.36 while the values of reference translation parameter may be varied between −10 and 10 for a curve of length, for example 100. Based on the above mentioned parameters, the 1-D curves are warped and values of the scaling parameter and the translation parameter are computed based on the method explained with reference to FIG. 4. In an embodiment, an average percentage error between the computed scaling parameter and the translation parameter w.r.t reference scaling parameter and the translation parameter respectively are determined to be as about 6% and 0.47% respectively.

In another example embodiment, similar experiments may be conducted for two images, and an average error in the computation of scaling parameter, translation parameter in x-direction and the translation parameter in the y-direction may be determined. In an example scenario, the average error in the computation of scaling parameter, translation parameter in x-direction and the translation parameter in the y-direction is determined to be 1.12%, 11.57% and 9.2%.

Without in any way limiting the scope, interpretation, or application of the claims appearing below, a technical effect of one or more of the example embodiments disclosed herein is to estimate image parameters. The image parameters, for example, scaling parameter and the translation parameters may be utilized for facilitating image alignment. The disclosed method provides a robust way of estimating image parameters so that the image alignment may be performed in a robust manner. The method include converting the two-dimensional matching for examples the images into 1-D matching by computing 1-D horizontal and vertical projections of the images. The computation of the image parameters is performed by utilizing the 1-D curves, thereby reducing the complexity in computation of image parameters. The method finds application in robustly and accurately tracking objects due to the accuracy in computation of the image parameters. Also, the method may be utilized for robustly and accurately stabilizing video content with minimal complexity.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

We claim:

1. A method comprising:
   determining at least one first one-dimensional (1-D) curve and at least one second 1-D curve;
   computing alignment parameters indicative of alignment adjustment between the at least one first 1-D curve and the at least one second 1-D curve; and
   computing, with a processor, a scaling parameter and at least one translation parameter between the at least one first 1-D curve and the at least one second 1-D curve based at least on the alignment parameters, wherein the scaling parameter and the at least one translation parameter are computed based on an expression:

$$h1\_ind(x) = m * h2\_ind(x) + c,$$

wherein, h1_ind(x) is the alignment parameter associated with at least one first 1-D curve, h2_ind(x) is the alignment parameter associated with at least one second 1-D curve, m is the scaling parameter, and c is the at least one translation parameter.

2. The method as claimed in claim 1, wherein the alignment parameters are associated with corresponding matching locations between the at least one first 1-D curve and the at least one second 1-D curve.

3. The method as claimed in claim 1, wherein computing the scaling parameter and the at least one translation parameter comprises estimating a straight line associated with a minimum distance path between the at least one first 1-D curve and at least one second 1-D curve, the minimum distance being less than a predetermined threshold distance.

4. The method as claimed in claim 1, wherein determining the at least one first 1-D curve comprises determining a horizontal 1-D integral projection curve and a vertical 1-D integral projection curve associated with a first image of an image sequence, and determining the at least one second 1-D curve comprises determining a horizontal 1-D integral projection curve and a horizontal 1-D integral projection curve associated with a second image of the image sequence.

5. The method as claimed in claim 4, wherein the scaling parameter and the at least one translation parameter are computed based on the expressions:

$$h1\_ind(x) = m*h2\_ind(x) + dx; \text{ and}$$

$$v1\_ind(x) = m*v2\_ind(x) + dy;$$

wherein, h1_ind(x) and v1_ind(x) are the alignment parameters associated with the at least one first 1-D curve; h2_ind(x) and v2_ind(x) are the alignment parameters associated with the at least one second 1-D curve, m is the scaling parameter, dx is the at least one translation parameter in x-direction, and dy is the at least one translation parameter in y-direction.

6. The method as claimed in claim 4, wherein computing the scaling parameter and the at least one translation parameter comprises:
   computing the scaling parameter and the at least one translation parameter in the x-direction based on the alignment parameters associated with the at least one horizontal 1-D integral projection curve; and
   computing the at least one translation parameter in the y-direction based on the alignment parameters associated with the at least horizontal 1-D integral projection curve and the scaling parameter, wherein computing the at least one translation parameter based on the computed alignment parameter facilitates in increasing the accuracy of computation.

7. An apparatus comprising:
   at least one processor; and
   at least one memory comprising computer program code, the at least one memory and the computer program code configured to, with the at least one processor, cause the apparatus to at least perform:
      determining at least one first 1-D curve and at least one second 1-D curve;
      computing alignment parameters indicative of alignment adjustment between the at least one first 1-D curve and the at least one second 1-D curve; and
      computing a scaling parameter and at least one translation parameter between the at least one first 1-D curve and the at least one second 1-D curve based at least on the alignment parameters, wherein the apparatus is further caused, at least in part, to compute the scaling parameter and the at least one translation parameter based on an expression:

$$h1\_ind(x) = m*h2\_ind(x) + c,$$

wherein, h1_ind(x) is the alignment parameter associated with at least one first 1-D curve, h2_ind(x) is the alignment parameter associated with at least one second 1-D curve, m is the scaling parameter, and c is the at least one translation parameter.

8. The apparatus as claimed in claim 7, wherein the alignment parameters are associated with corresponding matching locations between the at least one first 1-D curve and the at least one second 1-D curve.

9. The apparatus as claimed in claim 7, wherein the apparatus is further caused, at least in part, to compute the scaling parameter and the at least one translation parameter by:
   estimating a straight line associated with a minimum distance path between the at least one first 1-D curve and at least one second 1-D curve, the minimum distance being less than a predetermined threshold distance.

10. The apparatus as claimed in claim 7, wherein the apparatus is further caused, at least in part, to:
   determine the at least one first 1-D curve by determining a horizontal 1-D integral projection curve and a vertical 1-D integral projection curve associated with a first image of an image sequence, and
   determine the at least one second 1-D curve by determining a horizontal 1-D integral projection curve and a vertical 1-D integral projection curve associated with a second image of the image sequence.

11. The apparatus as claimed in claim 10, wherein the apparatus is further caused, at least in part, to: determine the scaling parameter and the at least one translation parameter are computed based on the expressions:

$$h1\_ind(x) = m*h2\_ind(x) + dx; \text{ and}$$

$$v1\_ind(x) = m*v2\_ind(x) + dy;$$

wherein, h1_ind(x) and v1_ind(x) are the alignment parameters associated with the at least one first 1-D curve; h2_ind(x) and v2_ind(x) are the alignment parameters associated with the at least one second 1-D curve, m is the scaling parameter, dx is the at least one translation parameter in x-direction, and dy is the at least one translation parameter in y-direction.

12. The apparatus as claimed in claim 10, wherein the apparatus is further caused, at least in part, to compute the scaling parameter and the at least one translation parameter by:
   computing the scaling parameter and the at least one translation parameter in the x-direction based on the alignment parameters associated with the at least one horizontal 1-D integral projection curve; and
   computing the at least one translation parameter in the y-direction based on the alignment parameters associated with the at least one vertical 1-D integral projection curve and the scaling parameter, wherein computing the at least one translation parameter based on the computed alignment parameter facilitates in increasing the accuracy of computation.

13. The apparatus as claimed in claim 7, wherein the apparatus comprises a communication device comprising:
   a user interface circuitry and user interface software configured to facilitate a user to control at least one function of the communication device through use of a display and further configured to respond to user inputs; and
   a display circuitry configured to display at least a portion of a user interface of the communication device, the display and display circuitry configured to facilitate the user to control at least one function of the communication device.

14. The apparatus as claimed in claim 13, wherein the communication device comprises a mobile phone.

15. A computer program product comprising at least one computer-readable storage medium, the computer-readable storage medium comprising a set of instructions, which, when executed by one or more processors, cause an apparatus at least to perform:
- determining at least one first 1-D curve and at least one second 1-D curve;
- computing alignment parameters indicative of alignment adjustment between the at least one first 1-D curve and the at least one second 1-D curve; and
- computing a scaling parameter and at least one translation parameter between the at least one first 1-D curve and the at least one second 1-D curve based at least on the alignment parameters,
- wherein the apparatus is further caused, at least in part, to compute the scaling parameter and the at least one translation parameter based on an expression:

$$h1\_ind(x)=m*h2\_ind(x)+c,$$

wherein, h1_ind(x) is the alignment parameter associated with at least one first 1-D curve, h2_ind(x) is the alignment parameter associated with at least one second 1-D curve, m is the scaling parameter, and c is the at least one translation parameter.

16. The computer program product as claimed in claim 15, wherein the apparatus is further caused, at least in part, to compute the scaling parameter and the at least one translation parameter by:
- estimating a straight line associated with a minimum distance path between the at least one first 1-D curve and at least one second 1-D curve, the minimum distance being less than a predetermined threshold distance.

17. The computer program product as claimed in claim 15, wherein the apparatus is further caused, at least in part, to:
- determine the at least one first 1-D curve by determining a horizontal 1-D integral projection curve and a vertical 1-D integral projection curve associated with a first image of an image sequence, and
- determine the at least one second 1-D curve by determining a horizontal 1-D integral projection curve and a vertical 1-D integral projection curve associated with a second image of the image sequence.

* * * * *